(12) United States Patent
Maruyama (10) Patent No.: US 12,162,496 B2
(45) Date of Patent: Dec. 10, 2024

(54) DRIVING SUPPORT DEVICE

(71) Applicant: HONDA MOTOR CO., LTD., Tokyo (JP)

(72) Inventor: Masaki Maruyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 398 days.

(21) Appl. No.: 17/676,849

(22) Filed: Feb. 22, 2022

(65) Prior Publication Data

US 2022/0306120 A1    Sep. 29, 2022

(30) Foreign Application Priority Data

Mar. 26, 2021    (CN) .......................... 202110323498.5

(51) Int. Cl.
*B60W 40/04*    (2006.01)
*B60W 40/08*    (2012.01)
*B60W 50/02*    (2012.01)

(52) U.S. Cl.
CPC ............ *B60W 40/04* (2013.01); *B60W 40/08* (2013.01); *B60W 50/0205* (2013.01); *B60W 50/0225* (2013.01); *B60W 2540/225* (2020.02); *B60W 2554/80* (2020.02)

(58) Field of Classification Search
CPC .. B60W 40/04; B60W 40/08; B60W 50/0205; B60W 50/0225; B60W 2540/225; B60W 2554/80
See application file for complete search history.

(56) References Cited

U.S. PATENT DOCUMENTS

| | | | | |
|---|---|---|---|---|
| 10,572,746 | B2 * | 2/2020 | Banno | B60W 30/08 |
| 2018/0362053 | A1 * | 12/2018 | Isa | G02B 27/00 |
| 2021/0394775 | A1 * | 12/2021 | Julian | B60W 40/08 |
| 2022/0237277 | A1 * | 7/2022 | Rahman | G06V 10/82 |
| 2022/0297713 | A1 * | 9/2022 | Wang | B60W 40/105 |
| 2022/0324459 | A1 * | 10/2022 | Narumi | G08G 1/16 |

FOREIGN PATENT DOCUMENTS

JP    2013047019 A    3/2013

\* cited by examiner

*Primary Examiner* — Peter D Nolan
*Assistant Examiner* — Anwar Mohamed
(74) *Attorney, Agent, or Firm* — CKC & Partners Co., LLC (57) ABSTRACT

A driving support device is provided which can estimate the line-of-sight of an occupant with high accuracy. A driving support device 11 includes: a peripheral information acquisition unit 40 which acquires peripheral information of the periphery of a vehicle 1; a driver monitor camera 50 which acquires occupant information related to the occupant of the vehicle 1; an outside-world information detection unit 201 which detects the outside-world information including the position and speed of the target in the surroundings of the vehicle 1 based on the peripheral information; a line-of-sight estimation unit 202 which estimates the line-of-sight of the occupant of the vehicle 1 based on the occupant information; and a line-of-sight correction unit 203 which corrects the estimated line-of-sight, based on the outside-world information detected by the outside-world information detection unit 201.

4 Claims, 6 Drawing Sheets

DRIVING SUPPORT DEVICE

This application is based on and claims the benefit of priority from Chinese Patent Application No. CN202110323498.5, filed on 26 Mar. 2021, the content of which is incorporated herein by reference.

BACKGROUND OF THE INVENTION

Field of the Invention

The present invention relates to a driving support device.

Related Art

Conventionally, technology for detecting whether a driver is watching a vehicle mirror has been known (for example, refer to Patent Document 1). A vehicle mirror control device disclosed in Patent Document 1 determines whether the driver is watching a vehicle mirror, and performs adjustment of the mirror surface angle of the vehicle mirror according to a determination result.

Patent Document 1: Japanese Unexamined Patent Application, Publication No. 2013-047019

SUMMARY OF THE INVENTION

However, judging whether an occupant is watching a vehicle mirror has a high degree of technical difficulty, and has required to estimate the line-of-sight of the occupant with high accuracy.

Therefore, the present invention has an object of providing a driving support device which can estimate the line-of-sight of an occupant with high accuracy.

A driving support device (for example, the driving support device 11 described later) according to one aspect of the present disclosure includes: a peripheral information acquisition unit (for example, the peripheral information acquisition unit 40 described later) which acquires peripheral information of a periphery of a vehicle (for example, the vehicle 1 described later); an occupant information acquisition unit (for example, the driver monitor camera 50 described later) which acquires occupant information related to an occupant of the vehicle; an outside-world information detection unit (for example, the outside-world information detection unit 201 described later) which detects outside-world information including a position and speed of a target in surroundings of the vehicle based on the peripheral information; a line-of-sight estimation unit (for example, the line-of-sight estimation unit 202 described later) which estimates a line-of-sight of the occupant of the vehicle based on the occupant information; and a line-of-sight correction unit (for example, the line-of-sight correction unit 203 described later) which corrects the line-of-sight which was estimated, based on the outside-world information detected by the outside-world information detection unit.

The target is another vehicle (for example, other vehicle 300 described later), the outside-world information detection unit calculates a relative speed between the other vehicle and the vehicle, in a case of the outside-world information including the other vehicle traveling at a position offset in a lateral direction from the travel direction of the vehicle, and the line-of-sight correction unit corrects the line-of-sight, based on the relative speed detected by the outside-world information detection unit.

The line-of-sight estimation unit determines whether the occupant is watching within a predetermined range in a left/right direction from a side mirror for a predetermined time, based on the relative speed; and the line-of-sight correction unit corrects the line-of-sight, in a case of the occupant watching within a predetermined range in a left/right direction from the side mirror for the predetermined time.

The line-of-sight of the occupant is following the other vehicle, within the predetermined range in the left/right direction from the side mirror, in a case of the relative speed of the other vehicle being at least a predetermined value, and estimates that the occupant is orienting the line-of-sight in a direction of the side mirror, in a case of determining that the line-of-sight of the occupant is not following the other vehicle; and the line-of-sight correction unit corrects the line-of-sight with error between a reference side mirror line-of-sight direction indicating a reference of a line-of-sight direction of the side mirror and a line-of-sight in a direction of the side mirror that was estimated, as a correction value.

The driving support device further includes an occupant status estimation unit (for example, the occupant status estimation unit 204) which estimates an occupant status of the vehicle based on the occupant state, in which the line-of-sight correction unit corrects the line-of-sight in a case of being estimated by the occupant status estimation unit that the occupant is wearing glasses.

In addition, the occupant information acquisition unit is disposed at a center in the left/right direction of the vehicle.

The target is another vehicle (for example, other vehicle 300 described later), the outside-world information detection unit detects a relative speed between the other vehicle and the vehicle, in a case of the outside-world information including the other vehicle existing in a travel direction of the vehicle, the line-of-sight estimation unit determines whether the line-of-sight of the occupant has been changed in a case of the relative speed of the other vehicle being at least a predetermined amount, and estimates that the occupant is orienting the line-of-sight in a vehicle travel direction from a driver seat, in a case of the line-of-sight of the occupant not having been changed, and the line-of-sight correction unit corrects the line-of-sight with error between a reference travel direction indicating a reference for the travel direction of the vehicle and a travel direction line-of-sight of the occupant thus estimated, as a correction value.

According to the present invention, it is possible to provide a driving support device which can estimate the line-of-sight of an occupant with high accuracy.

DETAILED DESCRIPTION OF THE INVENTION

Figure 1:
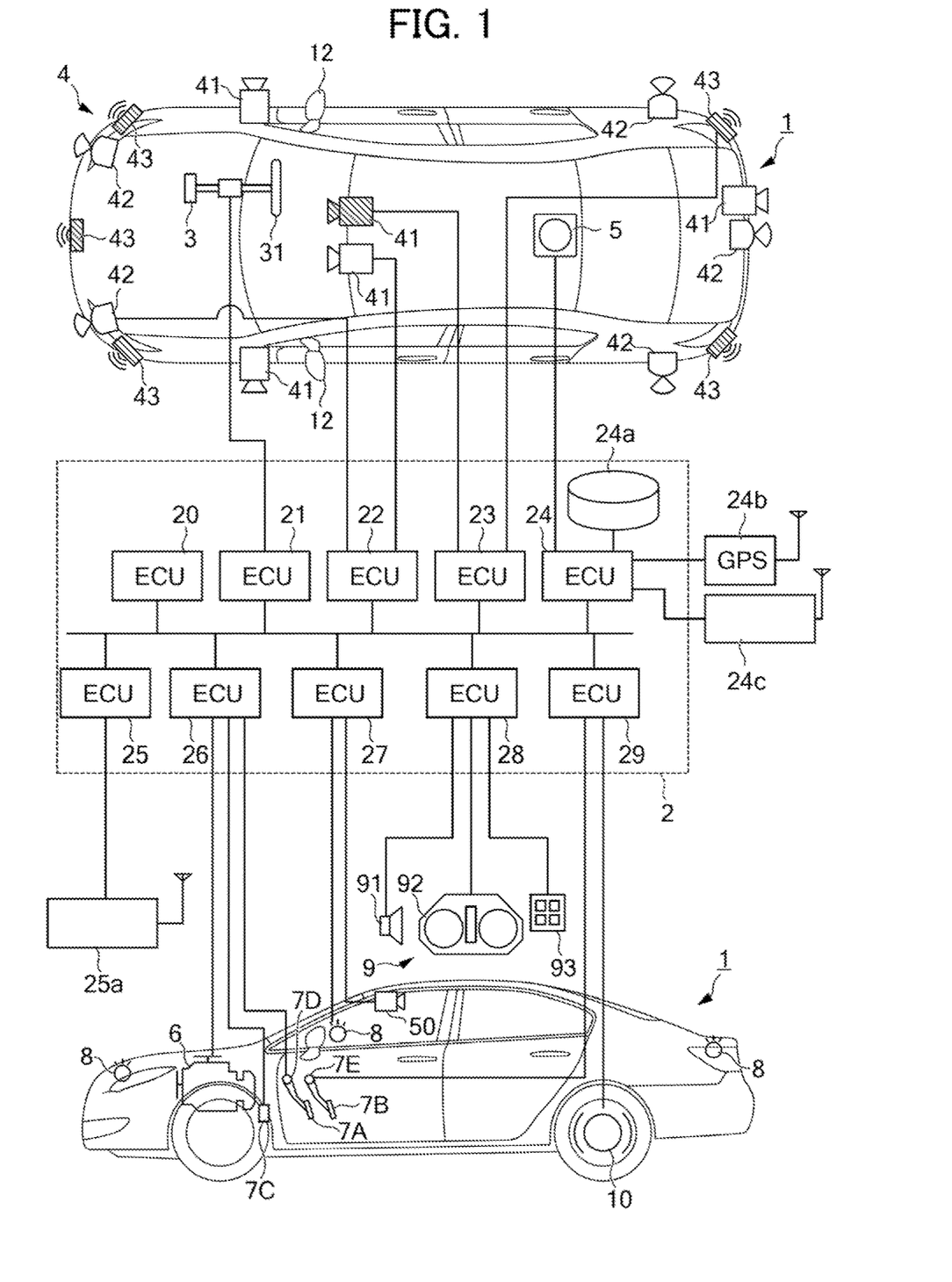
FIG. 1 is a block diagram showing the configuration of a vehicle according to the present embodiment.

Hereinafter, an embodiment of a driving support device of the present invention will be explained while referencing the drawings. FIG. 1 is a block diagram showing the configuration of a vehicle 1 according to the present embodiment. FIG. 1 shows an outline of the vehicle 1 by combining a plan view and a side view. The vehicle 1 is a four-wheeled occupant car of sedan type as one example.

The vehicle 1 includes a control device 2. The control device 2 includes a plurality of ECUs (automatic driving ECU 20~stop control ECU 29) connected to enable transmitting by way of an onboard network. Each ECU functions as a computer including a processor of which a CPU is representative, a storage device such as semiconductor memory, an interface such as an external device, etc. The program executed by a processor, and data used in processing by the processor, etc. are stored in the storage device. Each ECU may include a plurality of processors, storage devices, interfaces, etc.

Hereinafter, the function of each automatic driving ECU 20 to stop control ECU 29, etc. will be explained. It should be noted that the number of ECUs and corresponding functions can be set appropriately, and can be subdivided or integrated more than the ECUs shown in the present embodiment.

The automatic driving ECU 20 executes control for automatic driving of the vehicle 1. In automatic driving, the automatic driving ECU 20 automatically controls at least one of steering of the vehicle 1, or acceleration and deceleration.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic driving, the steering ECU 21 automatically controls the electric power steering device 3 in response to the instruction from the automatic driving ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor 24*b* and communication device 24*c*, and performs information processing of detection results or communication results. The gyro sensor 5 detects gyration of the vehicle 1. The position recognition ECU 24 can determine the route of the vehicle 1, according to the detection results of the gyro sensor 5, wheel speed, etc.

The GPS sensor 24*b* detects the current position of the vehicle 1. The communication device 24*c* performs wireless communication with a server that provides map information, traffic information, etc. The position recognition ECU 24 can access a database 24*a* of map information constructed in the storage device, and the position recognition ECU 24 performs route guidance from a current location to a destination, etc.

The communication control ECU 25 includes a communication device 25*a* for inter-vehicle communication. The communication device 25*a* performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

A vehicle external notification control ECU 27 controls a lighting system such as directional indicators (winkers) 8. In the case of the example in FIG. 1, the directional indicators 8 are provided to the front, side mirrors 12 and rear of the vehicle 1.

A vehicle internal notification control ECU 28 performs control of an input/output device 9. The input/output device 9 performs output of information to the driver, and reception of inputs of information from the driver. The input/output device 9 has a voice output device 91, display device 92 and input device 93.

The voice output device 91 reports informed by way of voice to the driver. The display device 92 notifies information by the display of images to the driver. The display device 92 is arranged in front of the driver's seat, and configures an instrument panel, etc. It should be noted that although voice and display are exemplified herein, it may notify of information by vibration or light. In addition, the input/output device 9 may notify information by combining a plurality of voice, display, vibration or light. Furthermore, the input/output device 9 may differentiate the combinations according to the level of information to notify (for example, urgency), and differentiate the notification mode.

The input device 93 is arranged at a position allowing operation by the driver, and is a switch group for performing instruction to the vehicle 1; however, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a driver monitor camera 50 which acquires occupant information related to occupants of the vehicle 1 as captured images. The driver monitor camera 50, for example, is configured by a digital camera made using solid-state image sensors such as CCD (Charge Coupled Device) or CMOS (Complementary Metal Oxide Semiconductor), and the type thereof is not particularly limited. The driver monitor camera 50 is arranged at the center in the left/right direction of the vehicle 1. For example, the driver monitor camera 50 may be provided in the vicinity of the display device 92, and arranged in the center in the left/right direction of the vehicle 1.

Figure 2:
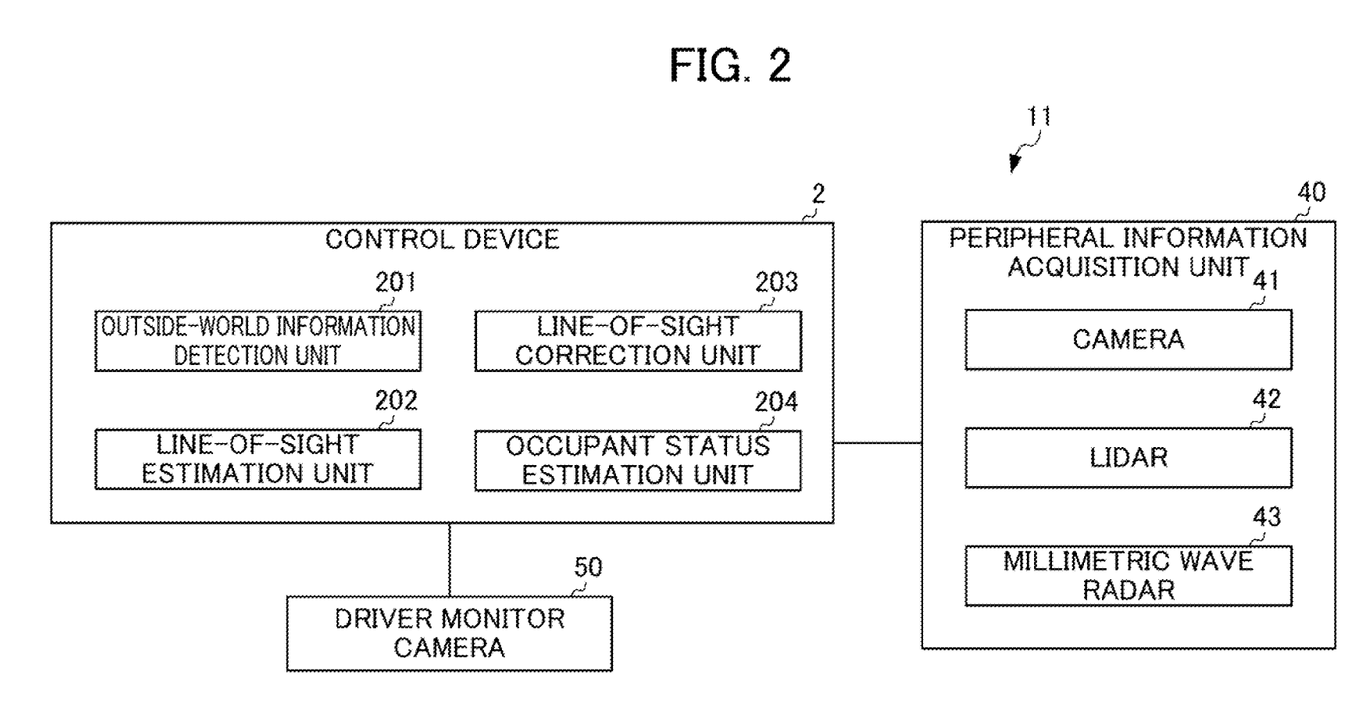
FIG. 2 is a view showing the functional configuration of a driving support device of the vehicle according to the present embodiment.

Hereinafter, processing of the driving support device 11 of the vehicle 1 according to the present embodiment will be explained. FIG. 2 is a view showing the functional configuration of the driving support device 11 of the vehicle 1 according to the present embodiment. As shown in FIG. 2, the driving support device 11 includes the control device 2, peripheral information acquisition unit 40 and driver monitor camera 50.

The control device 2 includes an outside-world information detection unit 201, line-of-sight estimation unit 202, line-of-sight correction unit 203 and occupant status estimation unit 204. The peripheral information acquisition unit 40 includes the aforementioned camera 41, LIDAR 42 and millimetric wave radar 43.

The peripheral information acquisition unit 40 acquires peripheral information of the periphery of the vehicle 1. For example, the peripheral information acquisition unit 40 acquires peripheral information of the front, sides and rear of the vehicle 1. The peripheral information is images of the periphery at the front, sides and rear of the vehicle 1 acquired by the camera 41, for example. In addition, the peripheral information may be data of the periphery at the front, sides and rear of the vehicle 1 acquired by the LIDAR 42 or millimetric wave radar 43, for example.

The driver monitor camera 50 acquires the aforementioned occupant information related to an occupant of the vehicle 1 as captured images.

The outside-world information detection unit 201 detects outside-world information including the position and speed of an object in the surroundings of the vehicle 1, based on the peripheral information acquired by the peripheral information acquisition unit 40. More specifically, the outside-world information detection unit 201 detects outside-world information including the position and speed of another vehicle traveling in the surroundings of the vehicle 1, based on captured images of the periphery of the vehicle 1 captured by the camera 41, and the data of the periphery of the vehicle 1 acquired by the LIDAR 42 or millimetric wave radar 43

The line-of-sight estimation unit 202 estimates the line-of-sight of an occupant of the vehicle 1, based on the captured images as occupant information acquired by the driver monitor camera 50.

The line-of-sight correction unit 203 corrects the line-of-sight of the occupant of the vehicle 1 estimated by the line-of-sight estimation unit 202, based on the outside-world information detected by the outside-world information detection unit 201.

The occupant status estimation unit 204 estimates the occupant status of the vehicle 1 based on the occupant information acquired by the driver monitor camera 50. More specifically, the occupant status estimation unit 204 analyzes captured images as occupant information acquired by the driver monitor camera 50, and estimates the status of the occupant inside of the vehicle 1.

More specifically, the outside-world information detection unit 201, in the case of the detected outside-world information including another vehicle traveling at a position offset in the lateral direction from the forward direction of the vehicle 1, calculates the relative speed between the other vehicle and the vehicle 1.

The line-of-sight correction unit 203 corrects the line-of-sight of the occupant of the vehicle 1 estimated by the line-of-sight estimation unit 202, based on the relative speed detected by the outside-world information detection unit 201.

In addition, the line-of-sight estimation unit 202 determines whether the occupant of the vehicle 1 is watching within a range of a side mirror line-of-sight region R in the left/right direction from the side mirror 12 for a predetermined time (for example, within 0.3 seconds), based on the relative speed. The line-of-sight correction unit 203 corrects the line-of-sight estimated by the line-of-sight estimation unit 202, in the case of the occupant watching within the range of the side mirror line-of-sight region R in the left/right direction from the side mirror 12 for a predetermined time.

Figure 3:
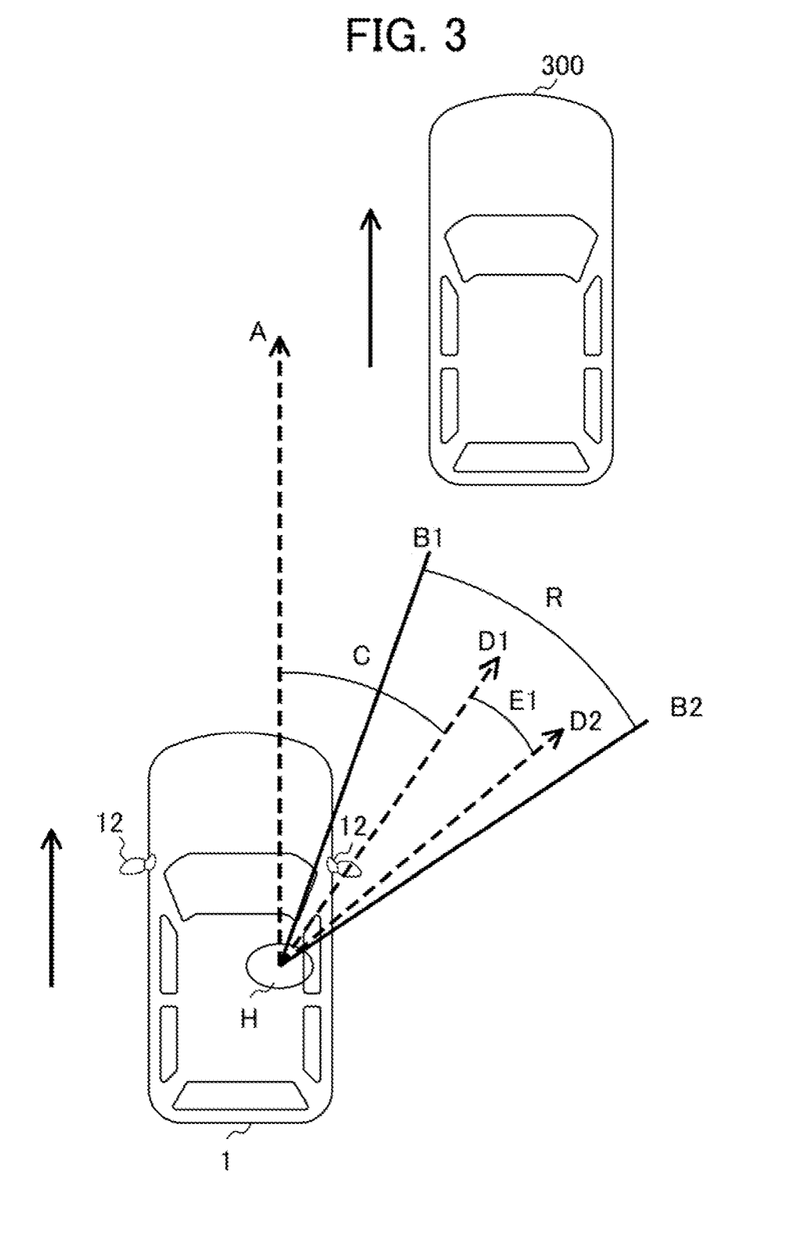
FIG. 3 is a view showing a specific example of correcting the line-of-sight of an occupant of the vehicle, in the case of another vehicle traveling at a position offset in a lateral direction from the travel direction of the vehicle.

FIG. 3 is a view showing a specific example of correcting the line-of-sight of the occupant of the vehicle 1, in the case of the other vehicle 300 traveling at a position offset to a lateral direction from the travel direction of the vehicle 1. As shown in FIG. 3, the vehicle 1 is traveling straight ahead, and the other vehicle 300 is traveling at a position offset to a lateral direction from the travel direction of the vehicle 1.

The line-of-sight serving as a reference of an occupant H of the vehicle 1 is shown as the line-of-sight A. The side mirror line-of-sight region R of the right-side side mirror 12 of the vehicle 1 is defined as a region between the line-of-sight direction B1 and line-of-sight direction B2. The standard side mirror line-of-sight direction D1 is a line-of-sight showing the reference of the line-of-sight direction of the side mirror 12.

The line-of-sight D2 shows the line-of-sight of the occupant H estimated by the line-of-sight estimation unit 202. In addition, the line-of-sight A and reference side mirror line-of-sight direction D1 are known values, and a region C formed by the line-of-sight A and reference side mirror line-of-sight direction D1 is also a known value.

Then, as shown in FIG. 3, the line-of-sight estimation unit 202, in the case of the relative speed of the other vehicle 300 being at least a predetermined value (for example, 10 km/h), determines whether the line-of-sight of the occupant H is following the other vehicle 300, within a range of the side mirror line-of-sight region R. For example, the line-of-sight estimation unit 202 determines that the line-of-sight of the vehicle H is following the other vehicle 300, in the case of the line-of-sight of the occupant H moving according to the movement of the other vehicle 300.

The line-of-sight estimation unit 202 estimates that the occupant H is orienting the line-of-sight D2 in the direction of the side mirror 12, in the case of determining that the line-of-sight of the occupant is not following the other vehicle 300. The line-of-sight correction unit 203 corrects the line-of-sight with the error E1 between the reference side mirror line-of-sight direction D1 indicating the reference of the line-of-sight direction of the side mirror 12 and the line-of-sight D2 of the direction of the side mirror estimated, as a correction value.

In addition, the line-of-sight correction unit 203 performs correction of the line-of-sight D2 estimated by the line-of-sight estimation unit 202, in the case of estimating by the occupant status estimation unit 204 that the occupant of the vehicle 1 is wearing glasses.

It should be noted that, in the above explanation, the side mirror 12, other vehicle 300, reference side mirror line-of-sight direction D1 and line-of-sight D2 indicate the status all on the same side (for example, right side direction or left side direction of side mirror 12).

Figure 4:
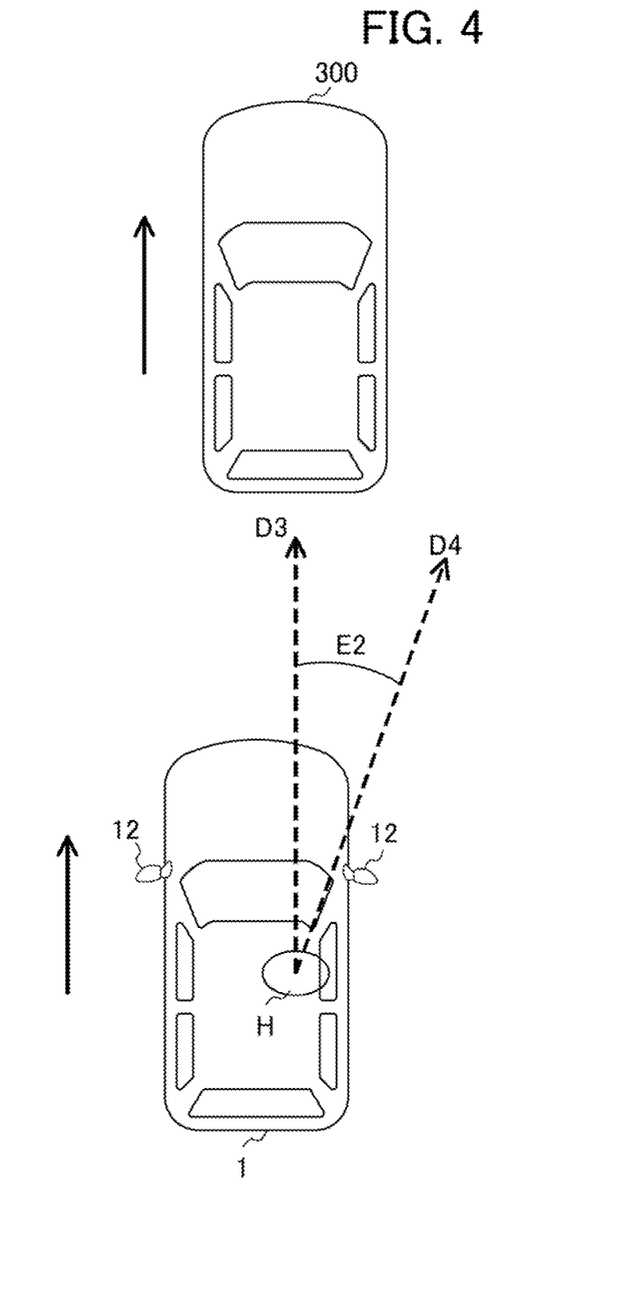
FIG. 4 is a view showing a specific example of correcting the line-of-sight of the occupant of the vehicle in the case of the other vehicle traveling ahead in the travel direction of the vehicle.

In addition to the above-mentioned processing, the driving support device 11 executes processing such as that shown below, in the case of the other vehicle 300 traveling ahead in the travel direction of the vehicle 1.

FIG. 4 is a view showing a specific example of correcting the line-of-sight of the occupant of the vehicle 1, in the case of the other vehicle 300 traveling ahead in the travel direction of the vehicle 1.

As shown in FIG. 4, the vehicle 1 is traveling straight ahead, and the other vehicle 300 is traveling ahead in the travel direction of the vehicle 1. The reference travel direction D3 is the line-of-sight direction indicating the reference of the travel direction of the vehicle 1, and the line-of-sight D4 indicates the line-of-sight of the occupant H estimated by the line-of-sight estimation unit 202.

The outside-world information detection unit 201 detects the relative speed between the other vehicle 300 and the vehicle 1, in the case of the detected outside-world information including the other vehicle 300 existing in the travel direction of the vehicle 1. The line-of-sight estimation unit 202 determines whether the line-of-sight of the occupant H has been changed, in the case of the relative speed of the other vehicle 300 being at least a predetermined value (for example, 10 km/h). More specifically, the line-of-sight estimation unit 202 determines that the line-of-sight of the occupant H has been changed, in the case of the line-of-sight of the occupant H moved by at least a fixed range.

The line-of-sight estimation unit 202 estimates that the occupant H is orienting the line-of-sight D4 in the vehicle travel direction (for example, forward direction) from the driver seat, in the case of determining that the line-of-sight of the occupant H has not been changed.

The line-of-sight correction unit 203 corrects the line-of-sight D4 with the error E2 between the reference travel direction D3 indicating a reference of the travel direction of the vehicle 1 and the line-of-sight D4 of the occupant H estimated, as the correction value.

It should be noted that the line-of-sight correction unit 203 in the aforementioned embodiment performs correction of the line-of-sight in the left/right direction, rather than correction of the line-of-sight in the vertical direction from the occupant viewpoint.

Figure 5:
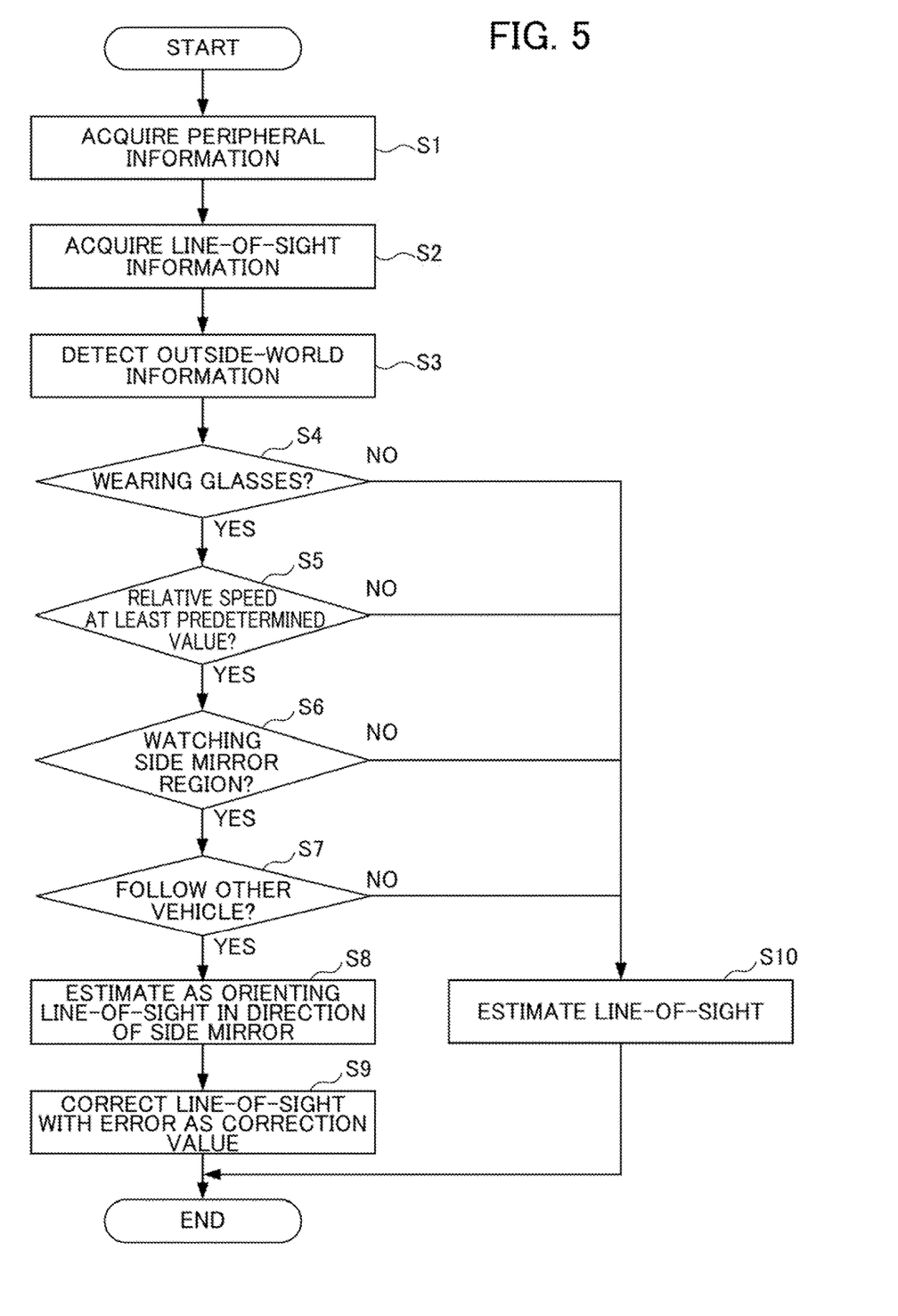
FIG. 5 is a flowchart showing processing of correcting the line-of-sight of the occupant of the vehicle in the case of the other vehicle traveling at a position offset in a lateral direction from the travel direction of the vehicle.

FIG. 5 is a flowchart showing the processing of correcting the line-of-sight of the occupant of the vehicle 1, in the case of the other vehicle 300 traveling at a position offset in a lateral direction from the travel direction of the vehicle 1.

In Step S1, the peripheral information acquisition unit 40 acquires peripheral information of the periphery of the vehicle 1. In Step S2, the driver monitor camera 50 acquires occupant information related to the occupant of the vehicle 1, as captured images.

In Step S3, the outside-world information detection unit 201 detects outside-world information including the position and speed of other vehicles in the surroundings of the vehicle 1, based on the peripheral information acquired by the peripheral information acquisition unit 40. In addition, the outside-world information detection unit 201 calculates the relative speed between the other vehicle 300 and the vehicle 1, in the case of the detected outside-world information including the other vehicle 300 traveling at a position offset in a lateral direction from the travel direction of the vehicle 1.

In Step S4, the occupant status estimation unit 204 analyzes the captured images as occupant information acquired by the driver monitor camera 50, and estimates the status of the occupant inside of the vehicle 1. Then, the line-of-sight estimation unit 202 determines whether being estimated by the occupant status estimation unit 204 that the occupant of the vehicle 1 is wearing glasses. In the case of estimating that the occupant of the vehicle 1 is wearing glasses (YES), the processing advances to Step S5. On the other hand, in the case of not estimating that the occupant of the vehicle 1 is wearing glasses (NO), the processing advances to Step S10.

In Step S5, the line-of-sight estimation unit 202 determines whether the relative speed of the other vehicle 300 is at least a predetermined value (for example, 10 km/h). In the case of the relative speed being at least the predetermined value (YES), the processing advances to Step S6. On the other hand, in the case of the relative speed being less than the predetermined value (NO), the processing advances to Step S10.

In Step S6, the line-of-sight estimation unit 202 determines whether the occupant of the vehicle 1 is watching within the range of the side mirror line-of-sight region R in the left/right direction from the side mirror 12 for a predetermined time (for example, 0.3 seconds). In the case of watching within the range of the side mirror line-of-sight region R for a predetermined time (YES), the processing advances to Step S7. On the other hand, in the case of not watching within the range of the side mirror line-of-sight region R for a predetermined time (NO), the processing advances to Step S10.

In Step S7, the line-of-sight estimation unit 202 determines whether the line-of-sight of the occupant H is following the other vehicle 300, within the range of the side mirror line-of-sight region R. In the case of the line-of-sight following the other vehicle 300 (YES), the processing advances to Step S8. On the other hand, in the case of the line-of-sight not following the other vehicle 300 (NO), the processing advances to Step S10.

In Step S8, the line-of-sight estimation unit 202 estimates that the occupant H is orienting the line-of-sight D2 in the direction of the side mirror 12, rather than the other vehicle 300, due to determining in Step S7 that the line-of-sight of the occupant H is not following the other vehicle 300.

In Step S9, the line-of-sight correction unit 203 corrects the line-of-sight with the error E1 between the reference side mirror line-of-sight direction D1 indicating the reference of the line-of-sight direction of the side mirror 12, and the line-of-sight D2 of the direction of the side mirror estimated, as the correction value.

In Step S10, the line-of-sight correction unit 203 determines the line-of-sight of the occupant H as the line-of-sight D2, without performing correction of the line-of-sight D2 of the direction of the side mirror estimated.

Figure 6:
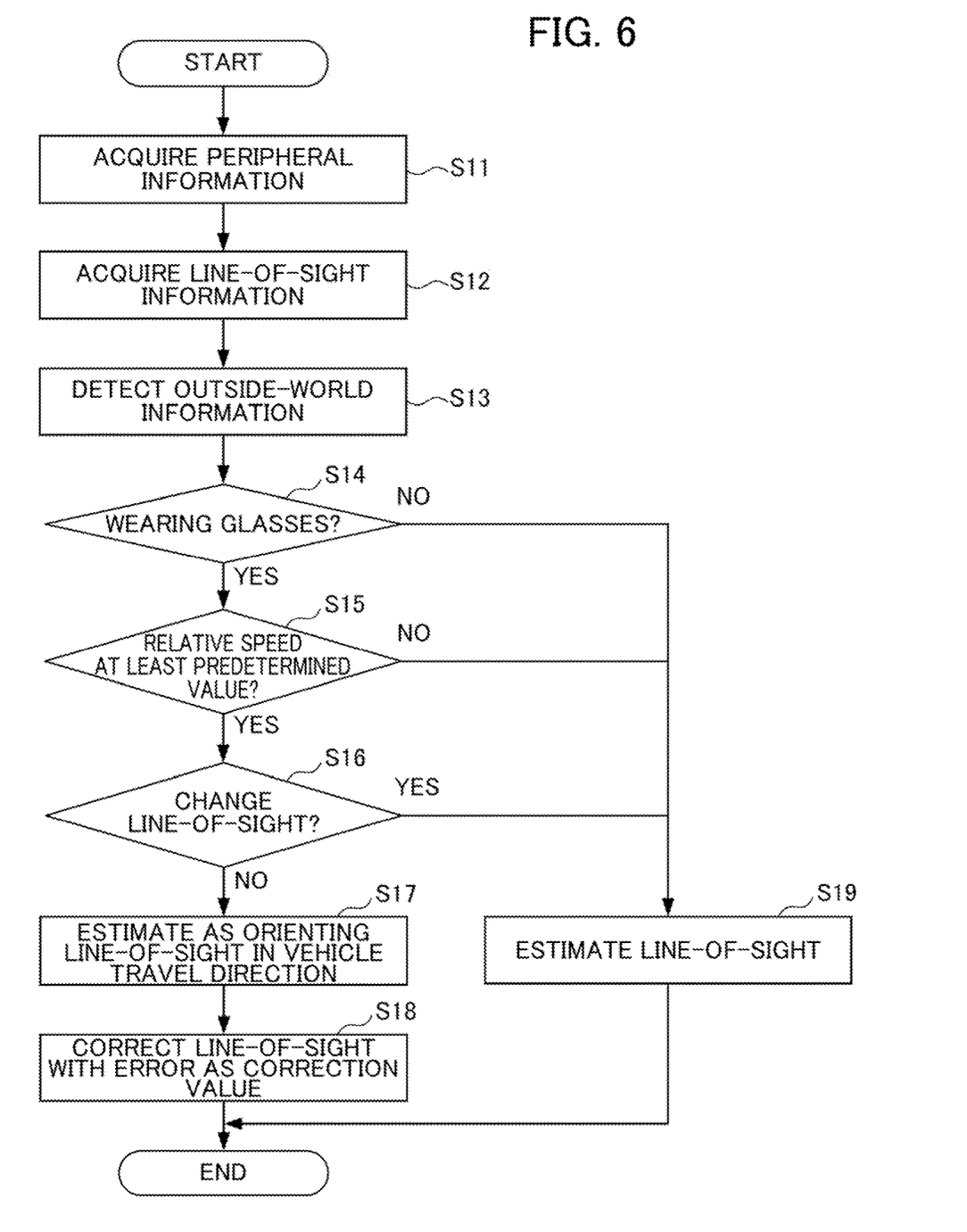
FIG. 6 is a flowchart showing processing of correcting the line-of-sight of the occupant of the vehicle in the case of the other vehicle traveling ahead in the travel direction of the vehicle.

FIG. 6 is a flowchart showing the processing of correcting the line-of-sight of the occupant of the vehicle 1, in the case of the other vehicle 300 traveling ahead in the travel direction of the vehicle 1.

In Step S11, the peripheral information acquisition unit 40 acquires peripheral information of the periphery of the vehicle 1. In Step S12, the driver monitor camera 50 acquires the occupant information related to the occupant of the vehicle 1 as captured images.

In Step S13, the outside-world information detection unit 201 detects the outside-world information including the position and speed of other vehicles in the surroundings of the vehicle 1, based on the peripheral information acquired by the peripheral information acquisition unit 40. In addition, the outside-world information detection unit 201 calculates the relative speed between the other vehicle 300 and vehicle 1, in the case of the detected outside-world information including the other vehicle 300 traveling in the travel direction of the vehicle which is the vehicle 1.

In Step S14, the occupant status estimation unit 204 analyzes the captured images as the occupant information acquired by the driver monitor camera 50, and estimates the status of the occupant inside of the vehicle 1. Then, the line-of-sight estimation unit 202 determines whether being estimated by the occupant status estimation unit 204 that the occupant of the vehicle 1 is wearing glasses. In the case of estimating that the occupant of the vehicle 1 is wearing glasses (YES), the processing advances to Step S15. On the other hand, in the case of not estimating that the occupant of the vehicle 1 is wearing glasses (NO), the processing advances to Step S19.

In Step S15, the line-of-sight estimation unit 202 determines whether the relative speed of the other vehicle 300 is at least a predetermined value (for example, 10 km/h). In the case of the relative speed being at least the predetermined value (YES), the processing advances to Step S16. On the other hand, in the case of the relative speed being less than the predetermined value (NO), the processing advances to Step S19.

It should be noted that, instead of the relative speed at this time, it may determine whether displacement of a predetermined angle occurred relative to the other vehicle, with the line-of-sight from the occupant position as a reference, and in the case of the displacement being at least a predetermined value, the processing may advance to Step S16 (for example, 5 deg/sec in units of visual angle). In other words, in the case of targeting a vehicle traveling in the adjacent lane or ahead by at least a predetermined distance, even in a case of the relative speed satisfying a predetermined value, when converting to the occupant line-of-sight, it may become relatively small displacement. On the other hand, by converting the relative speed of the other vehicle 300 into sight angle, and defining the threshold as units of visual angle, the line-of-sight estimation unit 202 comes to easily determine the estimation of whether the line-of-sight is oriented in the vehicle travel direction.

In Step S16, the line-of-sight estimation unit 202 determines whether the line-of-sight of the occupant H has been changed, in the case of the relative speed of the other vehicle 300 being at least a predetermined value. In the case of the line-of-sight having been changed (YES), the processing advances to Step S19. On the other hand, in the case of the line-of-sight not having been changed (NO), the processing advances to Step S17.

In Step S17, the line-of-sight estimation unit 202 estimates as the occupant H orienting the line-of-sight D4 in the vehicle travel direction (for example, forward direction) from the driver seat, in the case of determining that the line-of-sight of the occupant H has not been changed.

In Step S18, the line-of-sight correction unit 203 corrects the line-of-sight D4 with the error E2 between the reference travel direction D3 indicating the reference of the travel direction of the vehicle 1 and the line-of-sight D4 of the occupant H estimated, as the correction value.

In Step S19, the line-of-sight correction unit 203 specifies the line-of-sight of the occupant H as the line-of-sight D4, without performing correction of the line-of-sight D2 of the direction of the side mirror estimated.

According to the present embodiment, for example, the following effects are exerted. The driving support device 11 includes: the peripheral information acquisition unit 40 which acquires peripheral information of the periphery of the vehicle 1; the driver monitor camera 50 which acquires occupant information related to the occupant of the vehicle 1; the outside-world information detection unit 201 which detects the outside-world information including the position and speed of the target (for example, other vehicle 300) in the surroundings of the vehicle 1 based on the peripheral information; the line-of-sight estimation unit 202 which estimates the line-of-sight of the occupant of the vehicle 1 based on the occupant information; and the line-of-sight correction unit 203 which corrects the estimated line-of-sight, based on the outside-world information detected by the outside-world information detection unit 201. By correcting the estimated line-of-sight based on the outside-world information, the driving support device 11 can thereby estimate the line-of-sight of the occupant with high accuracy.

In addition, the target is the other vehicle 300, the outside-world information detection unit 201 calculates the relative speed between the other vehicle 300 and vehicle 1, in the case of the outside-world information including the other vehicle 300 traveling at a position offset in a lateral direction from the travel direction of the vehicle 1, and the line-of-sight correction unit 203 corrects the line-of-sight based on the relative speed detected by the outside-world information detection unit 201. The driving support device 11 can thereby estimate the line-of-sight of the occupant with high accuracy, by correcting the line-of-sight estimated, based on the relative speed between the other vehicle 300 and the vehicle 1.

In addition, the line-of-sight estimation unit 202 determines whether the occupant H is watching within a range of the side mirror line-of-sight region R in the left/right direction from the side mirror 12 for a predetermined time, and the line-of-sight correction unit 203 corrects the line-of-sight, in the case of the occupant H watching within a range of the side mirror line-of-sight region R in the left/right direction from the side mirror 12.

The driving support device 11 can thereby estimate the line-of-sight with high accuracy, by estimating as orienting the line-of-sight in the direction of the side mirror 12, in the case of watching within a range of the side mirror line-of-sight region R for a predetermined time.

In addition, the line-of-sight estimation unit 202, in the case of the relative speed of the other vehicle 300 being at least a predetermined value, determines that the line-of-sight of the occupant H is following the other vehicle 300, within the range of the side mirror line-of-sight region R in the left/right direction from the side mirror 12, and in the case of determining that the line-of-sight of the occupant H is not following the other vehicle 300, estimates that the occupant H is orienting the line-of-sight in the direction of the side mirror 12. The line-of-sight correction unit 203 corrects the line-of-sight D2 with the error E1 between the reference side mirror line-of-sight direction D1 indicating the reference of the line-of-sight direction of the side mirror 12 and the line-of-sight D2 of the direction of the side mirror 12 estimated, as the correction value.

The driving support device 11 can thereby obtain the line-of-sight corrected with the error, by correcting the line-of-sight D2 with the error E1 between the reference side mirror line-of-sight direction D1 and the line-of-sight D2 of the direction of the side mirror 12 estimated, as the correction value.

In addition, the driving support device 11 further includes the occupant status estimation unit 204 which estimates the occupant status of the vehicle 1 based on the occupant information, and the line-of-sight correction unit 203 corrects the line-of-sight, in the case of estimating by the occupant status estimation unit 204 that the occupant H is wearing glasses. Particularly in a case of the occupant wearing glasses, error tends to occur in the estimation of the line-of-sight due to the influence of glasses. For this reason, in the case of the occupant wearing glasses, the driving support device 11 can estimate the line-of-sight with high accuracy, by correcting the line-of-sight.

In addition, the driver monitor camera 50 is arranged at the center in the left/right direction of the vehicle 1. The driving support device 11 can thereby estimate the line-of-sight of the occupant, using the driver monitor camera 50 arranged at the center in the left/right direction of the vehicle 1. In particular, the driver monitor camera 50 is able to widely detect occupants, by arranging at the center of the vehicle width, and is suited to correction of the line-of-sight, due to not being hindered by the steering operation or the like, and the angle being made relative to the front of the occupant.

In addition, the target is the other vehicle 300, the outside-world information detection unit 201 detects the relative speed between the other vehicle 300 and the vehicle 1, in the case of the outside-world information including the other vehicle 300 existing in the travel direction of the vehicle 1, the line-of-sight estimation unit 202 determines whether the line-of-sight of the occupant H has been changed in the case of the relative speed of the other vehicle 300 being at least a predetermined amount, and estimates that the occupant H is orienting the line-of-sight in the vehicle travel direction from the driver seat in the case of the line-of-sight of the occupant H not having been changed, and the line-of-sight correction unit 203 corrects the line-of-sight D4 with the error E2 between the reference travel direction D3 indicating the reference for the travel direction of the vehicle 1 and the line-of-sight D4 of the occupant H estimated, as the correction value. The driving support device 11, for example, can thereby perform correction of the line-of-sight with high accuracy, in the case of the vehicle 1 traveling straight ahead.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes various types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS 1 vehicle
11 driving support device
40 peripheral information acquisition unit
50 driver monitor camera
201 outside-world information detection unit
202 line-of-sight estimation unit
203 line-of-sight correction unit
204 occupant status estimation unit

What is claimed is:

1. A driving support device comprising:
a processor;
a sensor which is configured to acquire peripheral information of a periphery of a vehicle, and
a camera which is configured to acquire occupant information related to an occupant of the vehicle,
wherein the processor is configured to;
detect outside-world information including a position and speed of a target in surroundings of the vehicle based on the peripheral information;
estimate a line-of-sight of the occupant of the vehicle based on the occupant information; and
correct the line-of-sight which was estimated, based on the outside-world information detected by the outside-world information detection unit,
wherein the target is another vehicle, wherein the processor calculates a relative speed between the other vehicle and the vehicle, in a case of the outside-world information including the other vehicle traveling at a position offset in a lateral direction from the travel direction of the vehicle, wherein the processor corrects the line-of-sight, based on the relative speed detected by the outside-world information detection unit, wherein the processor determines whether the occupant is watching within a predetermined range in a left/right direction from a side mirror for a predetermined time, based on the relative speed, wherein the processor corrects the line-of-sight, in a case of the occupant watching within a predetermined range in a left/right direction from the side mirror for the predetermined time, wherein the processor determines whether the line-of-sight of the occupant is following the other vehicle, within the predetermined range in the left/right direction from the side mirror, in a case of the relative speed of the other vehicle being at least a predetermined value, and estimates that the occupant is orienting the line-of-sight in a direction of the side mirror, in a case of determining that the line-of-sight of the occupant is not following the other vehicle, and wherein the processor corrects the line-of-sight with error between a reference side mirror line-of-sight direction indicating a reference of a line-of-sight direction of the side mirror and a line-of-sight in a direction of the side mirror that was estimated, as a correction value.

2. The driving support device according to claim 1, wherein the processor is configured to estimate an occupant status of the vehicle based on the occupant state,
wherein the processor corrects the line-of-sight in a case of being estimated that the occupant is wearing glasses.

3. The driving support device according to claim 2, wherein the camera is disposed at a center in the left/right direction of the vehicle.

4. The driving support device according to claim 1,
wherein the processor detects a relative speed between the other vehicle and the vehicle, in a case of the outside-world information including the other vehicle existing in a travel direction of the vehicle,
wherein the processor determines whether the line-of-sight of the occupant has been changed in a case of the relative speed of the other vehicle being at least a predetermined amount, and estimates that the occupant is orienting the line-of-sight in a vehicle travel direction from a driver seat, in a case of the line-of-sight of the occupant not having been changed, and wherein the processor corrects the line-of-sight with error between a reference travel direction indicating a reference for the travel direction of the vehicle and a travel direction line-of-sight of the occupant thus estimated, as a correction value.

* * * * *